L. P. AND O. F. PALMER.
CAMPING TRAILER.
APPLICATION FILED JULY 18, 1917.
1,320,794.
Patented Nov. 4, 1919.
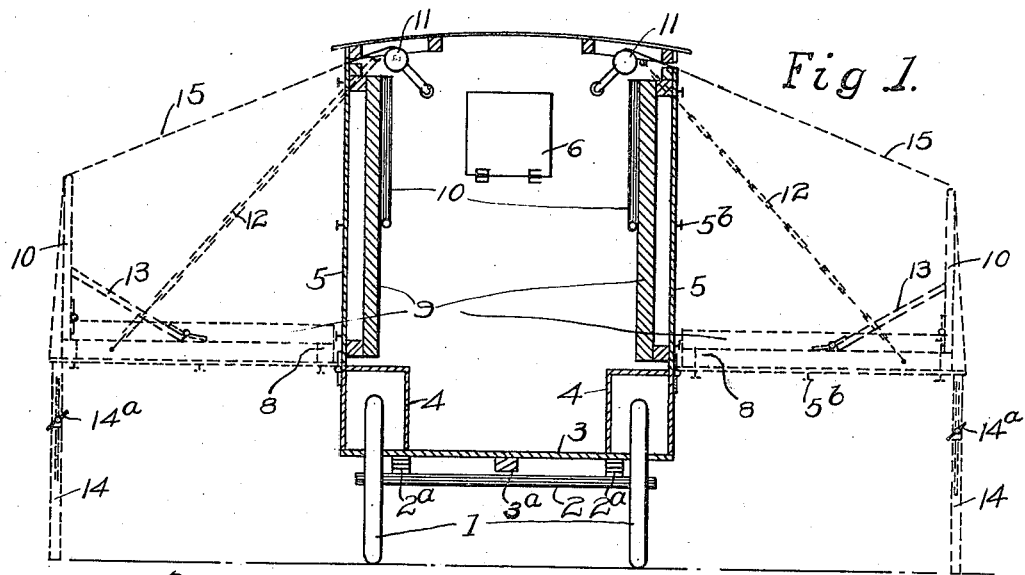
Inventors
Lillian Pray Palmer
& Oscar F Palmer
By A. B. Bowman
Attorney.

UNITED STATES PATENT OFFICE.

LILLIAN PRAY PALMER AND OSCAR F. PALMER, OF SAN DIEGO, CALIFORNIA.

CAMPING-TRAILER.

1,320,794.  Specification of Letters Patent.  Patented Nov. 4, 1919.

Application filed July 18, 1917. Serial No. 181,258.

*To all whom it may concern:*

Be it known that we, LILLIAN PRAY PALMER and OSCAR F. PALMER, citizens of the United States, residing at San Diego, in the county of San Diego and State of California, have invented certain new and useful Improvements in Camping-Trailers, of which the following is a specification.

Our invention relates to a trailer to be hauled behind an automobile carrying beds, food, etc., for camping purposes and the objects of our invention are: first, to provide a camping trailer of this class which may be easily operated by one person and in which everything is very compact in form when folded up in position for traveling; second, to provide a trailer of this class which provides comfort with ease of manipulation; third, to provide a camping trailer of this class which reduces to a minimum the liability of flies and mosquitos bothering; fourth, to provide a trailer of this class which combines a permanent wood structure with tenting for sleeping purposes; and fifth, to provide a trailer of this class which is very simple and economical of construction, durable, easy to operate and which will not readily deteriorate or get out of order.

With these and other objects in view as will appear hereinafter, our invention consists of certain novel features of construction, combination and arrangement of parts as will be hereinafter described in detail and particularly set forth in the appended claim reference being had to the accompanying drawings and to the characters of reference thereon which form a part of this specification, in which:

Figure 1 is a transverse sectional view of our trailer through 1—1 of Fig. 3, showing some of the parts in elevation to facilitate the illustration and showing the structure closed up ready for traveling by solid lines and showing the opening portion opened and ready for sleeping quarters by dotted lines; Fig. 2 is a rear end elevational view; Fig. 3 is a longitudinal sectional view through 3—3 of Fig. 2 and showing some of the parts in elevation to facilitate the illustration; Fig. 4 is a detailed fragmentary side view of the roller and spring pawl for holding said roller in certain positions and Fig. 5 is a side elevational view of one of the canvas flaps on the ends of the bed compartment when opened ready for use.

Similar characters of reference refer to similar parts throughout the several views of the drawings.

The wheels 1, axle 2, body 3, seats 4, hinged side members 5, door 6, door 7, spring mattresses 8, mattresses 9, canvas supports 10, rollers 11, chains 12, braces 13, adjustable supports 14, cover canvases 15, and end canvases 16 constitute the principal parts of our camping trailer.

The wheels 1 are preferably the ordinary automobile wheel of suitable size and are preferably provided with pneumatic tires that are revolubly mounted on an axle 2 which is secured to the body 3 by means of springs $2^a$ and said body 3 is secured to a longitudinal beam $3^a$ which extends horizontally along the middle of the body and extends some distance from the front end and serves as a tongue for connecting the trailer to the automobile. The body consists of a floor 3, sides, ends, and roof which are preferably composed of thin boards and mounted inside horizontally along the two sides are the seats 4 which are also preferably composed of thin boards. These seats 4 serve as seats for the convenience of the campers and may be used for eating the meals, etc., and the compartments formed by the seats are utilized for food receptacles except the space in the middle which provides clearance for the spring of the body relatively to the wheels. Hinged in the opposite sides are the hinged side members 5 which are adapted to open outwardly as shown by dotted lines in Fig. 1 of the drawings and are supported by means of supports 14 which are adjustable by being clamped together by bolts and wing nuts $14^a$ to provide for uneven ground. These supports 14 are loose and may be stored between the spring on the spring mattress 8 and the side members 5 before closing the side members 5 up when the trailer is ready for traveling. Mounted on the inner surface of each of the side members 5 is a spring mattress 8 which is an ordinary or conventional spring mattress and upon this spring mattress is mounted an ordinary or conventional bed mattress 9. Hinged to the outer side of the spring mattress 8 is the canvas support 10 which is adapted to fold down over the bed mattress 9 as shown best in Figs. 1 and 3 of the drawings when the trailer is closed up ready for traveling and when it is in its open position this support 10 is held in a normally vertical position by means of the braces 13 which are hinged to the ends of the spring mattress 8 and their ends engage with said support 10 and hold it outwardly, stretching the canvas 15 as shown best in Fig. 1 of the drawings. This canvas 15 is supported at its inner ends and adapted to wind on the roller 11 so that when the trailer is closed up ready for traveling the canvas 15 is wound up on the roller 11 and is held taut by means of the roller 11 held in position by the ratchet pawl 11$^a$ engaging the ratchet teeth 11$^b$ on said roller as shown best in Fig. 4 of the drawings. The chains 12 serve as supports for holding the side members 5 in approximately the right position and the supports 14 are placed into position thereunder. Each of the end canvases 16 are provided with screen netting 16$^a$ adapted to be covered with a flap 16$^b$ in case of stormy weather. In the front end there is provided a door 6 for ventilating purposes which swings inwardly and over the opening on the outside is provided a screen 6$^a$. The entrance door 7 in the rear end is preferably provided with a screen for ventilating purposes and is hinged at one side and is adapted as an entrance to the interior of the trailer. On each end of the sides 5 are provided a plurality of buttons 5$^b$ and the cover canvases 15 are provided with a plurality of buttons so that the end canvases 16 are readily secured to the canvas 15 and sides 5 when the trailer is opened for use. Mounted on the spring mattress 8 are straps 8$^a$ provided with buckles adapted for holding the bed mattress in position against the spring mattress when the side members 5 are closed as shown best in Figs. 1 and 3 of the drawings.

Though we have shown and described a particular construction, combination and arrangement of parts, we do not wish to be limited to this particular construction, combination and arrangement but desire to include in the purview of our invention the construction, combination and arrangement substantially as set forth in the appended claim.

It is obvious that with this construction there is provided a camping trailer with two full-sized beds which may be readily closed up for traveling purposes which is dust, mosquito and fly proof; that the trailer may be readily opened and closed by one person and that the trailer is simple and economical of construction and durable.

Having thus described our invention, what we claim as new and desire to secure by Letters Patent, is:

In a camping trailer, the combination of a portable body, hinged side members secured near the lower side thereof, bed springs and mattresses secured to the inner surfaces of each of said hinged side members, uprights secured to the normally upper edges of said side members by means of hinges, means for holding said upright members in certain position relatively to said side members and for collapsing the same, canvases secured to the upper edges of said hinged side members, rollers upon which said canvases are mounted and adapted to unroll with the outward movement of said side members, and means in connection with said rollers tending to hold said canvases taut when said side members are open.

In testimony whereof, we have hereunto set our hands at San Diego, California, this 12th day of July, 1917.

LILLIAN PRAY PALMER.
OSCAR F. PALMER.